US008717591B2

(12) United States Patent
Yagishita (10) Patent No.: US 8,717,591 B2
(45) Date of Patent: May 6, 2014

(54) IMAGE FORMING APPARATUS, IMAGE FORMING SYSTEM, INFORMATION PROCESSING APPARATUS, PROGRAM, AND STORAGE MEDIUM

(75) Inventor: Takahiro Yagishita, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 384 days.

(21) Appl. No.: 12/805,990

(22) Filed: Aug. 27, 2010

(65) Prior Publication Data

US 2011/0051173 A1    Mar. 3, 2011

(30) Foreign Application Priority Data

Aug. 31, 2009   (JP) ................................. 2009-200776

(51) Int. Cl.
*G06K 15/00* (2006.01)
*G06F 3/12* (2006.01)
*H04N 1/40* (2006.01)

(52) U.S. Cl.
USPC ........ 358/1.14; 358/1.13; 358/1.15; 358/3.28

(58) Field of Classification Search
None
See application file for complete search history.

(56) References Cited

U.S. PATENT DOCUMENTS

| 7,502,488 | B2 |   | 3/2009  | Abe et al. |
|---|---|---|---|---|
| 7,565,088 | B2 | * | 7/2009  | Shibasaki ........................ 399/81 |
| 8,159,723 | B2 | * | 4/2012  | Yamada ....................... 358/3.28 |
| 2003/0107753 | A1 |   | 6/2003  | Sakamoto |
| 2004/0080777 | A1 | * | 4/2004  | Smith ........................... 358/1.14 |
| 2004/0258277 | A1 | * | 12/2004 | Ueda ............................. 382/100 |
| 2006/0119886 | A1 |   | 6/2006  | Nemoto |
| 2006/0256127 | A1 |   | 11/2006 | Cho et al. |
| 2007/0071283 | A1 |   | 3/2007  | Yagishita |
| 2008/0074682 | A1 |   | 3/2008  | Komatsubara |
| 2009/0021765 | A1 | * | 1/2009  | Takahashi .................... 358/1.14 |
| 2009/0021794 | A1 |   | 1/2009  | Hara et al. |
| 2010/0046044 | A1 |   | 2/2010  | Ishizu et al. |

FOREIGN PATENT DOCUMENTS

| CN | 1424849 A | 6/2003 |
|---|---|---|
| CN | 1758770 A | 4/2006 |
| CN | 1862652 A | 11/2006 |

(Continued)

OTHER PUBLICATIONS

Chinese Office action Dec. 4, 2012 corresponding to Application No. 201010269590.

(Continued)

*Primary Examiner* — King Poon
*Assistant Examiner* — Vincent Peren
(74) *Attorney, Agent, or Firm* — Harness, Dickey & Pierce, P.L.C.

(57) ABSTRACT

An image forming apparatus includes a receiving unit to receive print data including image to be formed, identification information identifying a print-requesting person, personal identity verification information for verifying identity of person, and execution condition information designating priority between readability and productivity when implementing an information-leak proofed printing; an operation-input receiving unit to receive an input by an administrator; a setting unit to set whether the information-leak proofed printing is mandatory; a personal identity verification unit to verify identity of person when the information-leak proofed printing is mandatory and readability-priority is designated; a watermark embedding unit to generate a watermark-embedded image depending upon a result of the personal identity verification; a text synthesizing unit to generate a composite image by synthesizing text data to image data when the information-leak proofed printing is mandatory, and productivity priority is designated; and a print unit to print the watermark-embedded image or the composite image.

6 Claims, 6 Drawing Sheets

(56) References Cited

FOREIGN PATENT DOCUMENTS

| | | |
|---|---|---|
| CN | 1949818 A | 4/2007 |
| CN | 101034542 A | 9/2007 |
| CN | 101154147 A | 4/2008 |
| JP | 2001051813 A | 2/2001 |
| JP | 2006146490 A | 6/2006 |
| JP | 2007168282 A | 7/2007 |

OTHER PUBLICATIONS

Chinese Office action dated Apr. 22, 2013 corresponding to Application No. 201010269590.
Chinese Office action dated Jun. 24, 2013 corresponding to Application No. 201010269590.

* cited by examiner

|   |   | SECURITY INTENSITY LEVEL | PRODUCTIVITY | READABILITY |
|---|---|---|---|---|
| A | SECURE PRINTING + TRACE PRINTING (WITH WATERMARKING) | ○ = △ + △ | × = × + ○ | ○ = ○ + ○ |
| B | TRACE PRINTING (WITH COMPOSITE TEXT) | ○ | ○ | × |

FIG. 5

PRINTER: INITIAL SETTING 1    [ ? ]  [ CLOSE ]    ~SG1

SET INFORMATION-LEAK PROOFED
PRINTING AS MANDATORY MATTER?

- ⦿ YES
- ◯ NO

FIG. 6

PRINTER: INITIAL SETTING 2    [ ? ]  [ CLOSE ]    ~SG2

WHEN INFORMATION-LEAK PROOFED
PRINTING IS SET AS MANDATORY MATTER,
AND PRODUCTIVITY IS SET AS MANDATORY
MATTER, SELECT ANY ONE OF OPTIONS

- ⦿ COLOR-REDUCING CONVERSION
- ◯ PAGE COMBINING
- ◯ NOTHING

|  | SECURITY INTENSITY LEVEL | PRODUCTIVITY | READABILITY |
|---|---|---|---|
| SECURE PRINTING | △ | × | ○ |
| TRACE PRINTING (WITH WATERMARKING) | △ | ○ | ○ |
| TRACE PRINTING (WITH COMPOSITE TEXT) | ○ | ○ | × |

IMAGE FORMING APPARATUS, IMAGE FORMING SYSTEM, INFORMATION PROCESSING APPARATUS, PROGRAM, AND STORAGE MEDIUM

CROSS-REFERENCE TO RELATED APPLICATIONS

This application claims priority to Japanese Patent Application No. 2009-200776, filed on Aug. 31, 2009 in the Japan Patent Office, which is hereby incorporated by reference herein in its entirety.

BACKGROUND OF THE INVENTION

1. Field of the Invention

The present invention relates to an image forming apparatus, an image forming system, an information processing apparatus, program, and a storage medium storing the program.

2. Description of the Background Art

Recently, information leak in offices caused by careless handling of printed matter has become a problem. For example, printed matter may be forgotten to be picked up from image forming apparatuses such as printers at the point of production, or documents may be left on a desk in a careless way, by which sneak glance or theft of information may occur and then information leaks. Users may be educated not to forget to pick up printed matter or not to leave documents unattended, but the effects of such education are at best limited and an administrator is likely required to undertake aggressive countermeasures. Such countermeasures (or preventive measure) include secure printing and trace printing, which are two printing methods that have been widely used.

In secure printing, when an image forming apparatus connected to a personal computer (PC) receives a printing instruction, the image forming apparatus does not start a printing operation immediately. Instead, the printing operation is started when a user comes to the image forming apparatus and conducts a personal identity verification or check at the image forming apparatus. The personal identity verification can be implemented in various ways, such as placing an integrated circuit (IC) card over a card reader, inputting personal identity verification information such as a password from an operation panel, or the like (see, for example, JP-2001-051813-A). Such methods are not effective for careless documents leaving on desk, but can reduce forget-to-pick-up from an image forming apparatus, by which a moderate level of information security can be obtained.

At the same time, however, secure printing may not be so good for productivity. If secure printing is not used, a user can process other works with his or her PC until the completion of printing. However, if secure printing is applied, the user has to wait at the image forming apparatus for completion of printing, meaning that the user cannot do other works.

In trace printing, identification information that can identify a user is attached to the printed matter, which may be referred to as a print-requesting person instructing a printing operation. The administrator can then recover printed matter, which may be a document that is forgotten to be picked up from an image forming apparatus or document left on desk in a careless way, and can identify the print-requesting person, in which case a penalty or rule can be implemented and a measure for preventing such document mishandling can be implemented. Further, if a penalty is informed to print-requesting persons in advance, physiological effect of careful handling of printed matter may be expected.

In the trace printing, the identification information can be attached to printed matter in various ways, such as "watermark" and "composite text." The watermark attached to images is identification information that cannot be sensed directly but must be machine-read (see, for example JP-2007-168282-A). Specifically, printing technologies such as digital watermark, transparent ink, or the like can be used. The composite text is characters or text representing identifying information synthesized at an edge portion of one page image, such as a header and footer, as identification information (see for example JP-2006-146490-A).

The watermark needs to be read by an apparatus such as an image forming apparatus to extract the identification information, and miss-reading may occur for such extraction, by which only a moderate level of security can be obtained. The composite text, on the other hand, is read by only person, and miss-reading may not occur so much, and the composite text can be effective for preventing forget-to-pick-up from an image forming apparatus and documents leaving on desk in a careless way, by which a high level of information security can be obtained. However, the composite text may confuse people, insofar as a printout product consists of a mixture of sentences in a main text part and the identification information is also text, which may cause a problem of readability. Watermark, which cannot be sensed directly, does not have this problem.

Figure 12:
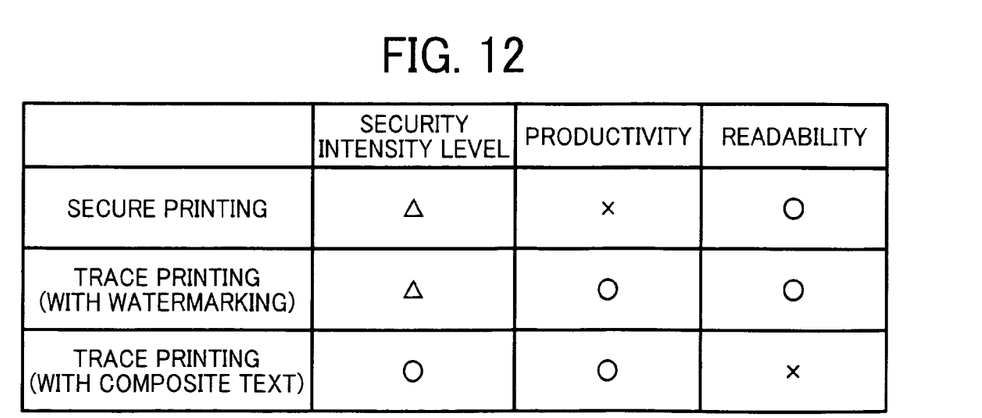
FIG. 12 is a chart that summarizes features of each type of information-leak proofed printing method.

FIG. 12 summarizes features of secure printing, trace printing using watermark, and trace printing using composite text. As shown in FIG. 12, secure printing, trace printing using watermark, and trace printing using composite text are evaluated in terms of security level attained, productivity, and readability.

Security Level:

"O (circle)" may indicate two cases. In one case, the concerned printing method is effective for preventing forget-to-pick-up from an image forming apparatus without problem of precision, and is effective for preventing document leaving on desk in a careless way without problem of precision; or in other case, the concerned printing method is effective for preventing forget-to-pick-up from an image forming apparatus without problem of precision, and is effective for preventing document leaving on desk in a careless way with some concern on precision.

"Δ (triangle)" may indicate two cases. In one case, the concerned printing method is effective for preventing forget-to-pick-up from an image forming apparatus with some concern on precision, and is effective for preventing document leaving on desk in a careless way with some concern on precision; or in other case, the concerned printing method is effective for preventing forget-to-pick-up up from an image forming apparatus without problem of precision, and is not effective for preventing document leaving on desk in a careless way.

Productivity:

"O (circle)" indicates that a user can conduct other process at a place of his or her personal computer until a printing has completed.

"X (cross)" indicates that a user cannot conduct other process until a printing has completed, but only wait completion of printing in front of an image forming apparatus.

Readability:

"O (circle)" indicates that text information is included as sentences in main text but text is not used as identification information and not included in a printout, by which sentences can be read easily.

"X (cross)" indicates that text information is included as sentences in main text and text is used as identification information and appears in a printout, by which sentences cannot be read easily.

Conventionally, the above-described secure printing and trace printing are generally managed by an administrator but not a user issuing a printing operation instruction. Accordingly, only the administrator may conduct whether to set secure printing and/or trace printing, and whether to select the trace printing using watermark or the trace printing using composite text. Such administrator settings may not be changed so frequently. At the same time, however, print-requesting persons have various demands for print-requested image such as setting priority between productivity and readability.

If secure printing or trace printing using watermark is set as a printing method, an administrator's demand of higher security cannot be satisfied, and if the trace printing using composite text is set as the printing method, a print-requesting person's demand of higher readability cannot be satisfied. As such, in a conventional method, an administrator's demand and a print-requesting person's demand cannot both be satisfied simultaneously for any given set of print settings.

SUMMARY

In one aspect of the present invention, an image forming apparatus including a receiving unit, an operation-input receiving unit, a setting unit, a personal identity verification unit, a watermark embedding unit, a text synthesizing unit, and a print unit is devised. The receiving unit receives print data from an information processing apparatus. The print data includes an image to be formed, identification information for identifying a person requesting the image to be formed, personal identity verification information for conducting a personal identity verification process for the person requesting the image to be formed, and execution condition information for designating priority to one of readability and productivity when implementing an information-leak proofed printing. The operation-input receiving unit receives an operation input by an administrator. The setting unit sets whether an implementation of the information-leak proofed printing is mandatory depending on an operation input by the administrator. The personal identity verification unit conducts a personal identity verification process using the personal identity verification information included in the print data when the information-leak proofed printing is set as mandatory, and readability is designated priority by the execution condition information included in the print data. The watermark embedding unit embeds the identification information as a watermark in one of an image generated from the print data and a converted image converted from the image depending upon a result of the personal identity verification. The text synthesizing unit generates a composite image by synthesizing the identification information included in the print data as text data to any one of an image generated from the print data and a converted image converted from the image when implementation of information-leak proofed printing is set as mandatory, and productivity is designated priority by the execution condition information included in the print data. The print unit conducts a printing operation for one of the image embedded with the watermark and the composite image.

In another aspect of the present invention, an image forming system including an information processing apparatus, and an image forming apparatus connected to the information processing apparatus is devised. The information processing apparatus includes an operation-input receiving unit, a setting unit, an execution condition generating unit, and a transmission unit. The operation-input receiving unit receives operation input by a person requesting image formation and an administrator. The setting unit sets whether implementation of information-leak proofed printing is mandatory depending on an operation input by the administrator. The execution condition generating unit generates execution condition information designating priority to one of readability and productivity when the information-leak proofed printing is implemented depending on an operation input by the person requesting image formation. The transmission unit transmits print data including a print-requested image designated by the operation input by the person requesting image formation, identification information for identifying the person requesting image formation, personal identity verification information for conducting a personal identity verification process for the person requesting image formation, and the execution condition information included in the print data to the image forming apparatus. The image forming apparatus includes a receiving unit, an operation-input receiving unit, a personal identity verification unit, a watermark embedding unit, a text synthesizing unit, and a print unit. The receiving unit receives the print data from the information processing apparatus. The operation-input receiving unit receives an operation input by the administrator. The setting unit sets whether an implementation of the information-leak proofed printing is mandatory depending on an operation input by the administrator. The personal identity verification unit conducts a personal identity verification process using the personal identity verification information included in the print data when the information-leak proofed printing is mandatory, and readability is designated priority by the execution condition information included in the print data. The watermark embedding unit embeds the identification information as a watermark in one of an image generated from the print data and a converted image converted from the image depending on a result of the personal identity verification. The text synthesizing unit generates a composite image by synthesizing the identification information included in the print data as text data in one of an image generated from the print data and a converted image converted from the image when an implementation of information-leak proofed printing is mandatory, and productivity is designated priority by the execution condition information included in the print data. The print unit conducts a printing operation for one of the image embedded with the watermark and the composite image.

In still another aspect of the present invention, an information processing apparatus includes an operation-input receiving unit, a setting unit, an execution condition generating unit, and a transmission unit. The operation-input receiving unit receives an operation input by an administrator. The setting unit sets whether an implementation of the information-leak proofed printing is mandatory depending on an operation input by the administrator. The execution condition generating unit generates execution condition information designating priority to one of readability and productivity when the information-leak proofed printing is implemented depending on an operation input by a user. The transmission unit transmits to an image forming apparatus print data including a print-requested image designated by the operation input by the user, identification information for identifying the user, personal identity verification information for conducting a personal identity verification process for the user, and the execution condition information included in the print data.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION OF EXEMPLARY EMBODIMENTS

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, Operations, elements, and/or components, but do not preclude the presence or addition of one or more other features, integers, steps, operations, elements, components, and/or groups thereof.

Furthermore, although in describing views illustrated in the drawings, specific terminology is employed for the sake of clarity, the present disclosure is not limited to the specific terminology so selected and it is to be understood that each specific element includes all technical equivalents that operate in a similar manner.

Referring now to the drawings, a plurality of example embodiments for an image forming apparatus, an image forming system, an information processing apparatus, program, and a storage medium are described.

Figure 1:
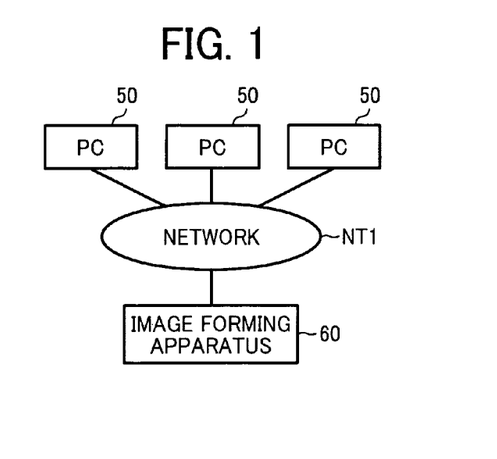
FIG. 1 is an example configuration of an image forming system according to one example embodiment.

FIG. 1 shows a schematic configuration of an image forming system according to an example embodiment. The image forming system of FIG. 1 may be configured with a personal computer (PC) 50, and an image forming apparatus 60, which are connected to each other via a network NT1. The network NT1 may be, for example, a local area network (LAN), an intranet, Ethernet (registered trademark), or the Internet, but not limited thereto.

The PC 50 transmits print data including print-requested image and printing conditions to the image forming apparatus 60 via the network NT1 when a user conducts an operation input. In this specification, the operation input may mean data, setting, condition, or the like that is input by a user or the like. Upon receiving the print data, the image forming apparatus 60 conducts image processing for the print data, and forms an image on a print medium, by which a printing operation is implemented. The print-requested image may be prepared as page-by-page image data, in which print data may be prepared as page-by-page image data, and thereby the print-requested image may be composed of one or more of page-by-page image data. The print medium that is printed with an image by a printing operation may be referred to as a printout product(s) or printed matter. The print data may be specified by a language such as for example page description language (PDL), but not limited thereto.

Figure 2:
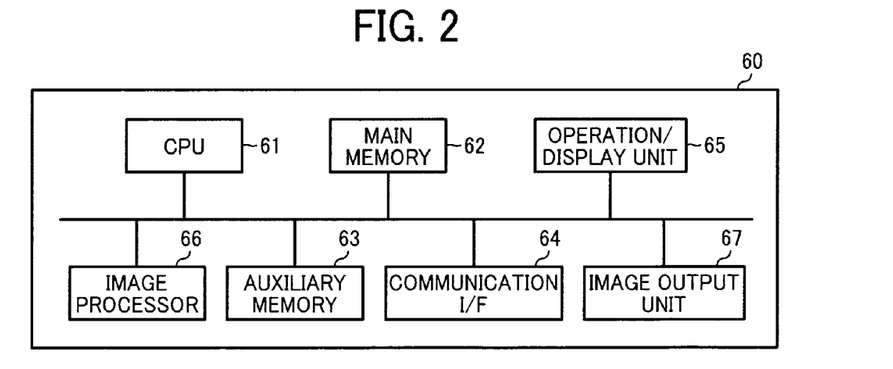
FIG. 2 is an example hardware configuration of image forming apparatus according to one example embodiment.

FIG. 2 shows an example hardware configuration of the image forming apparatus 60 according to an example embodiment. The image forming apparatus 60 may include a central processing unit (CPU) 61, a main memory 62, an auxiliary memory 63, an image processor 66, a communication interface (I/F) 64, an operation/display unit 65, an image output unit 67, and a bus connecting such units one to another, but not limited thereto. The CPU 61 controls the apparatus as a whole. The main memory 62 may be a read only memory (ROM), a random access memory (RAM) or the like storing various types of data and program. The auxiliary memory 63 may be a hard disk drive (HDD), a compact disk (CD) drive unit or the like storing various types of data and program. The operation/display unit 65 may include an operator inputting unit such as a keyboard, a mouse or the like to receive a user instruction input, and a display unit to display information, wherein such operator inputting unit and display unit may be integrated as one unit. The communication I/F 64 controls communication with an external device such as PC 50. The image processor 66 may be configured as, for example, an application specific integrated circuit (ASIC), a digital signal processor (DSP) or the like, and conducts various types of image processing such as rasterizing, error diffusion, gamma conversion to image data, corresponding to the print data received from the PC 50 via the communication I/F 64. The image output unit 67 may be configured as, for example, a white/black plotter, a one-drum color plotter, a four-drum color plotter, a scanner, a facsimile unit, or the like. The image output unit 67 forms the image data, processed by the image processor 66 onto a print medium to conduct a printing operation. Such image forming apparatus 60 can conduct various functions including printing functions such as information-leak proofed printing function (e.g., secure printing, trace printing), color-reducing conversion function, page combining function, but not limited thereto.

Figure 3:
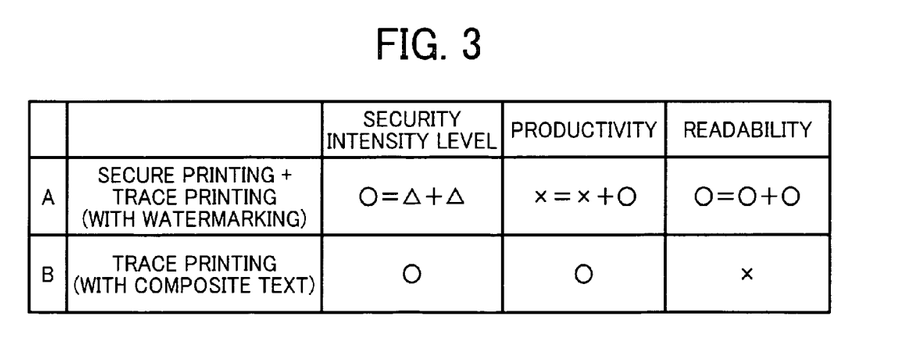
FIG. 3 is a chart that summarizes features of information-leak proofed printing methods according to one example embodiment.

In such configured image forming system, an administrator may set whether an implementation of the information-leak proofed printing is mandatory, and on one hand, a user (also referred to print-requesting person, or person requesting image formation), who instructs the PC 50 to conduct a printing operation, may select whether a priority is set for any one of readability and productivity when the information-leak proofed printing is implemented. When the priority is set for readability, the image forming apparatus 60 conducts both secure printing and trace printing embedding watermark (method A in FIG. 3), and when the priority is set for productivity, the image forming apparatus 60 conducts the trace printing using composite text (method B in FIG. 3). As shown in FIG. 3, the method A is a combination of secure printing and trace printing embedding watermark, and the method B is trace printing using composite text. The features of each of printing method are explained with reference to FIG. 12.

Method A:

Security level of secure printing and security level of trace printing embedding watermark can be combined, by which security level can be enhanced compared to a case that any one of secure printing and trace printing is implemented separately (see security level: O=Δ+Δ in FIG. 3). Specifically, secure printing has a security level that is "effective for preventing forget-to-pick-up from an image forming apparatus without problem of precision" (Δ) and the trace printing embedding watermark has a security level that is "effective for preventing document leaving on desk in a careless way with some concern on precision" (Δ), by which a good level of security intensity can be obtained.

The productivity of method A becomes a level of productivity of secure printing. Specifically, the level of productivity becomes X=X+O, in which the level of productivity of secure printing is "X" (see FIG. 12) and the level of productivity of trace printing embedding watermark is "O" (see FIG. 12), and when two levels are combined, the level of productivity of method A becomes "X," which is same as secure printing.

The readability of method A can be set to a good level because readability of secure printing and readability of trace printing embedding watermark are both at a good level (evaluated as "O" in FIG. 12). Accordingly, the security level and readability can be set at a good level for the method A.

Method B:

The method B is trace printing using composite text. Accordingly, as shown in FIG. 12, the security level and productivity can be set at a good level for the method B.

As above described, the security level can be set to high for both methods A and B by setting trace printing as mandatory for printing, by which an administrator's demand of preventing information leak can be satisfied. On one hand, because a print-requesting person (or person requesting image formation) can select priority between readability and productivity when the information-leak proofed printing is implemented, the print-requesting person's demand can be also satisfied. Accordingly, the above-described configuration can satisfy both the administrator demands and print-requesting person's demands.

Figure 4:
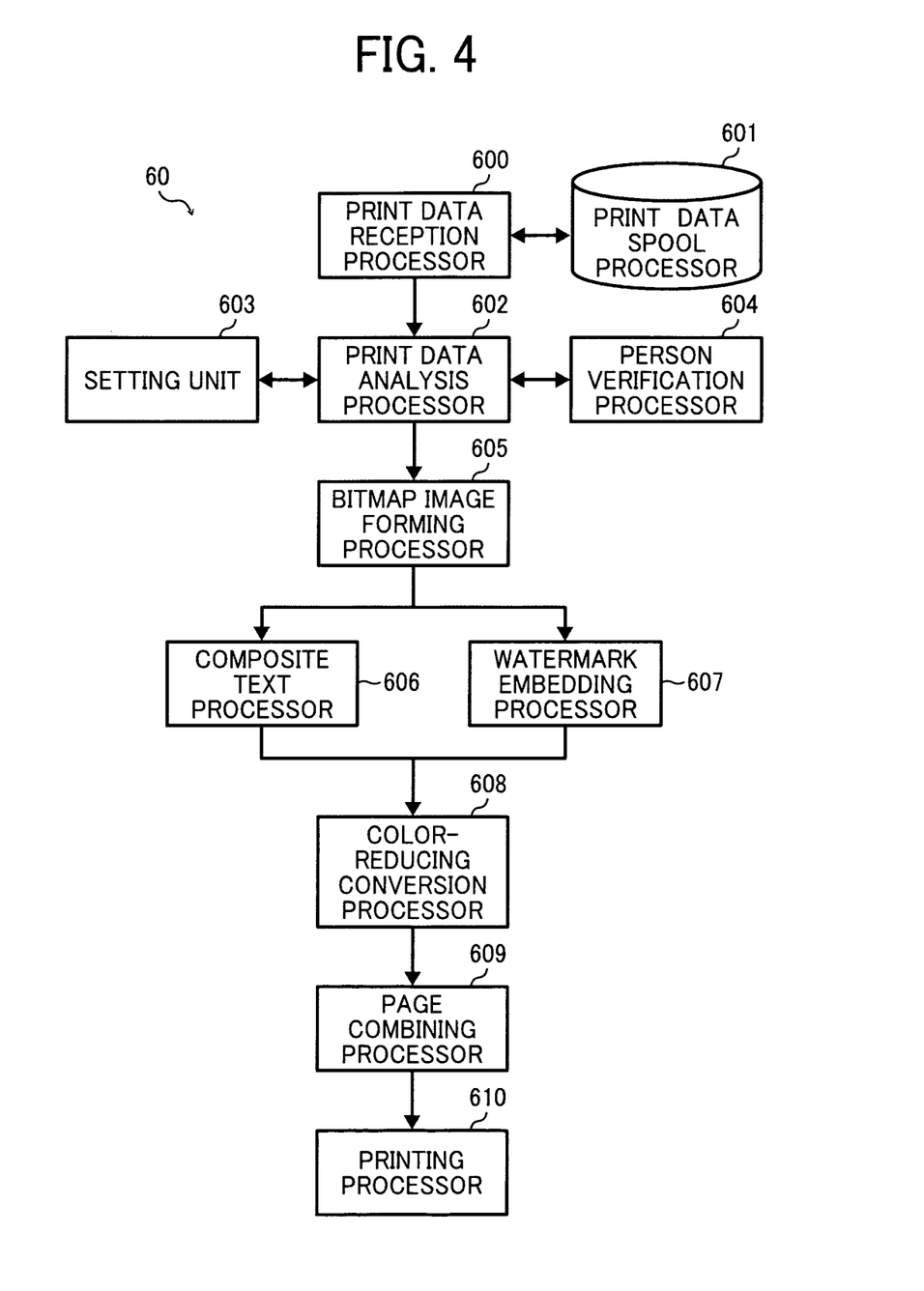
FIG. 4 is an example functional configuration of an image forming apparatus.

A description is now given to various types of functions, which can be implemented by executing various types of program stored in the main memory 62 and/or the auxiliary memory 63 by the CPU 61 of the image forming apparatus 60 having the above-described hardware configuration with reference to FIG. 4, which shows a functional configuration of image forming apparatus 60. The image forming apparatus 60 may include a print data reception processor 600, a print data spool processor 601, a print data analysis processor 602, a setting unit 603, a person verification processor 604, a bitmap image forming processor 605, a composite text processor 606, a watermark embedding processor 607, a color-reducing conversion processor 608, a page combining processor 609, and a printing processor 610, for example. Each of such functional units may be generated on the main memory 62 such as RAM when the CPU 61 executes program.

The print data reception processor 600 receives print data from the PC 50 via the communication I/F 64. The print data spool processor 601 spools the print data received by the print data reception processor 600 to the auxiliary memory 63 such as HDD. The setting unit 603 sets whether the information-leak proofed printing is implemented as mandatory, via the operation/display unit 65, and also sets whether any one of color-reducing conversion process and page combining process is implemented or both of reducing conversion process and page combining process is not implemented when the priority is set for productivity while the information-leak proofed printing is implemented. Specifically, for example, the setting unit 603 instructs the operation/display unit 65 to display a first initial setting screen SG1 shown in FIG. 5. Then, if an operation input selecting to set an implementation of the information-leak proofed printing as mandatory is received via the first initial setting screen SG1 of the operation/display unit 65, the setting unit 603 sets the information-leak proofed printing as mandatory.

Figure 6:
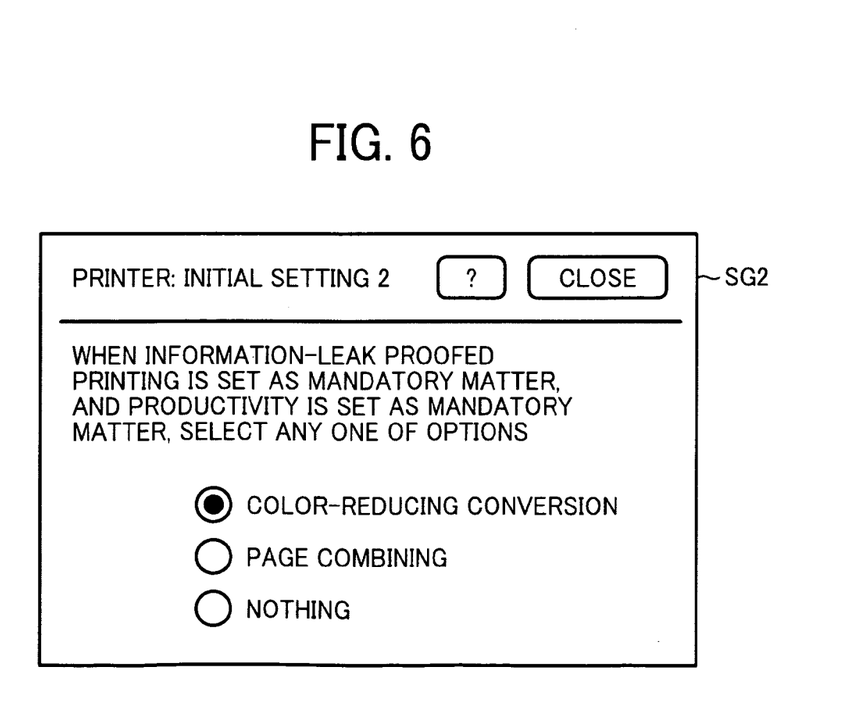
FIG. 6 is a second initial setting screen according to one example embodiment.

Further, the setting unit 603 instructs the operation/display unit 65 to display a second initial setting screen SG2 shown in FIG. 6. Then, when the information-leak proofed printing is set and the priority is set for productivity, and if an operation input, selecting any one of the color-reducing conversion process and the page combining process, or if an operation input not-selecting both of the color-reducing conversion process and the page combining process, is received via the second initial setting screen SG2 of the operation/display unit 65, the setting unit 603 sets any one of the color-reducing conversion process and page combining process, or the setting unit 603 sets an option of not conducting any processes depending on content of the operation input. Further, the setting content can be stored in the auxiliary memory 63 such as HDD, for example, as setting information.

Figure 5:
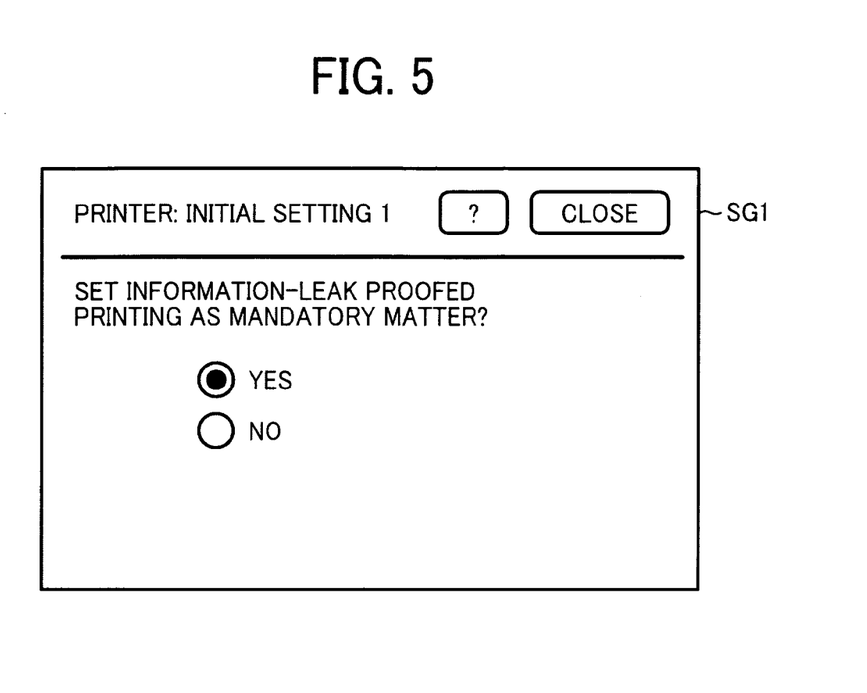
FIG. 5 is a first initial setting screen according to one example embodiment.

Further, it is preferable that the setting included in the first initial setting screen SG1 and the second initial setting screen SG2 can be set only by an administrator but cannot be set by a print-requesting person using a given configuration such as for example a configuration of requiring a password input.

The explanation returns to FIG. 4. The print data analysis, processor 602 analyzes the print data received by the print data reception processor 600 by interpreting PDL language. The print data includes printing conditions as above described. Such printing conditions may include, for example, color information used for printing images, print medium size such as paper size, the number of printing copies, or the like.

Further, in example embodiment, when the priority is set for productivity while the information-leak proofed printing is implemented by the PC 50, such productivity priority setting while the information-leak proofed printing is set may be designated by printing conditions.

Further, when the priority is set for readability while the information-leak proofed printing is implemented by the PC 50, such readability priority setting while the information-leak proofed printing is set may be designated by printing conditions. Such setting process using the PC 50 will be discussed later. The print data analysis processor 602 extracts image data corresponding to the print data, and analyzes printing conditions corresponding to the print data.

The person verification processor 604 checks the setting information and an analysis result of the print data analysis processor 602 to determine whether the personal identity verification is implemented.

Specifically, when the information-leak proofed printing is set as mandatory and the readability priority is set while the information-leak proofed printing is set, and personal identity verification information used for personal identity verification of a user is input via the operation/display unit 65, the person verification processor 604 conducts personal identity verification process using the personal identity verification information. The method of personal identity verification process may be implemented by known methods such as for example the method of JP-2001-051813-A or other methods. For example, personal identity verification information may be information such as a password input by a print-requesting person via the PC 50, and such personal identity verification information may be included in print data as one of the printing conditions. Then, the person verification processor 604 checks a password in the printing conditions and a password input via the operation/display unit 65 to conduct personal identity verification.

In another case, an IC (integrated circuit) card may be used for personal identity verification. When the IC card is used for personal identity verification, the IC card stores personal identity verification information in advance. The PC 50 obtains the personal identity verification information from the IC card, and sets the personal identity verification information in print data.

Further, when the image forming apparatus 60 is provided with a card reader, personal identity verification information can be obtained from the IC card using the card reader instead of using the operation/display unit 65, and then the obtained personal identity verification information and personal identity verification information included in the print data may be checked with each other. Further, information of a print-requesting person stored in advance in the PC 50 such as a mail address can be used as personal identity verification information to be included in print data. If a checking result of the person verification processor 604 indicates that the checked two pieces of personal identity verification information does not match, a printing process is stopped.

The bitmap image forming processor 605 conducts image processing such as rasterizing to image data extracted from the print data analysis processor 602 and generates a converted image converted by the bitmap format, for example.

The composite text processor 606 checks the setting information and an analysis result of the print data analysis processor 602. When the information-leak proofed printing is set as mandatory and the productivity priority is set while the information-leak proofed printing is set, the composite text processor 606 synthesizes identification information to the image generated by the bitmap image forming processor 605 to generate a composite image. The method of generating composite image synthesizing identification information may be implemented by known methods such as for example the method of JP-2006-146490-A. For example, identification information can be synthesized in a header or footer as text information, or large text information expressed by dot patterns can be synthesized on one page as background information printed on one page, or other methods can be used.

Further, identification information can be included in print data as one of printing conditions. The identification information may be, for example, a name or a user ID (identification) of print-requesting person that can identify the print-requesting person, and the identification information can be input or stored in advance to the PC 50. Such identification information may be synthesized, for example, in the header or footer of image, generated by the bitmap image forming processor 605, as text information by the composite text processor 606, by which a composite image can be generated.

When the information-leak proofed printing is set as mandatory and the readability priority is set while the information-leak proofed printing is set, depending on a result of personal identity verification by the person verification processor 604, the watermark embedding processor 607 embeds identification information to an image generated by the bitmap image forming processor 605 as watermark. The method of embedding a watermark may be implemented by known methods such as for example the method of JP-2007-168282-A. For example, watermark can be printed by using invisible ink, digital watermark can be formed by modulating a bitmap format image by identification information, or other known methods can be used.

The color-reducing conversion processor 608 checks the setting information and an analysis result of the print data analysis processor 602. When the information-leak proofed printing is set as mandatory and the productivity priority is set while the information-leak proofed printing is set, and a color-reducing conversion process is set, the color-reducing conversion processor 608 conducts a color-reducing conversion process, which reduces the number of colors for expressing the composite image generated by the composite text processor 606, as required. Specifically, if the composite image generated by the composite text processor 606 is a full color image, the number of colors for expressing the composite image may be a given number or more such as for example four colors or more. In such a case, the color-reducing conversion processor 608 converts the composite image to an image expressed with a reduced number of colors. For example, the composite image may be expressed with one color (e.g., black) or two colors (e.g., black and red), by which color-reduced image can be generated. Further, if a composite image generated by the composite text processor 606 is expressed by one color or two colors, the color-reducing conversion processor 608 may or may not conduct the color-reducing conversion process.

The page combining processor 609 checks the setting information and an analysis result of the print data analysis processor 602. When the information-leak proofed printing is set as mandatory and the productivity priority is set while the information-leak proofed printing is set, and a page combining process is set, the page combining processor 609 generates a page-combined image for the composite image generated by the composite text processor 606. The page-combined image can be formed by combining a plurality of pages having images into one page by decreasing the size of images. The number of pages to be combined together in one page may be referred to as a page-combining unit. The page-combining unit may be set in advance, or an administrator can set a given number for the page-combining unit via the operation/display unit 65.

Based on printing conditions of print data analyzed by the print data analysis processor 602, the printing processor 610 conducts a printing process for any one of a composite image generated by the composite text processor 606, an image generated by the color-reducing conversion processor 608, an image generated by the page combining processor 609, and an image embedded with a watermark by using the watermark embedding processor 607 on a print medium such as paper or the like, in which the printing processor 610 can conduct various types of image processing to the concerned image such as error diffusion, gamma conversion or the like.

A description is now given to a hardware configuration of the PC 50. The PC 50 may include a central processing unit (CPU), a main memory, an auxiliary memory, a communication interface, an operation/display unit, and a bus connecting such units one to another, but not limited thereto. The CPU controls the apparatus as a whole. The main memory may be a read only memory (ROM), a random access memory (RAM) or the like storing various types of data and program. The auxiliary memory may be a hard disk drive (HDD), a compact disk (CD) drive unit or the like storing various types of data and program. A hardware configuration of such PC 50 may be a typical computer. Further, the PC 50 may include an operator inputting unit such as a keyboard, a mouse or the like to receive a user instruction input, and a display unit to display information, wherein the operator inputting unit and display unit may be integrated as one unit. The communication I/F controls communication with an external device connected via wired connection or wireless connection. In example embodiment, the ROM or HDD may store a printer driver to transmit print data from the PC 50 to the image forming apparatus 60 when a user inputs operation information using the operator-inputting unit. In such a configuration, with a function of the printer driver, the PC 50 designates a print-requested image via the operator inputting unit, and designates printing conditions such as for example color information used for printing images, print medium size such as paper size, the number of printing copies. When a user (or print-requesting person) instructs a printing operation using an operation input, the operation input is received, and print data having the print-requested image and printing conditions is generated, and such print data is transmitted to the image forming apparatus 60.

Figure 7:
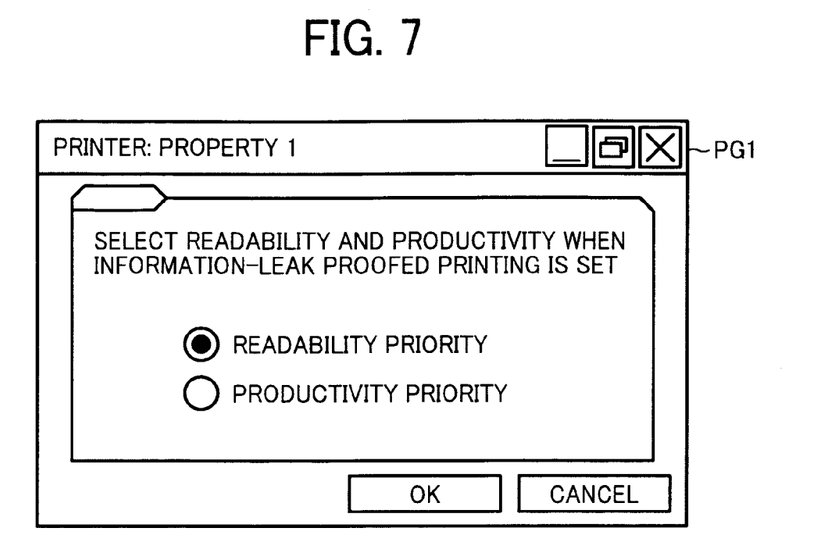
FIG. 7 is a first property screen according to one example embodiment.

When such process is implemented, the PC 50 displays a first property screen PG1 shown in FIG. 7 on the display unit, in which the readability priority or productivity priority for the information-leak proofed printing can be selected through the operator-inputting unit. Such operation input may be used as execution condition information designating which one of readability priority and productivity priority is to be implemented for the information-leak proofed printing, and the execution condition information is prepared and set as one condition of printing conditions. The CPU of PC 50 may be used as an execution condition generating unit to generate execution condition information to designate any one of readability priority and productivity priority when the information-leak proofed printing is implemented depending on an operation input by a print-requesting person.

Figure 8:
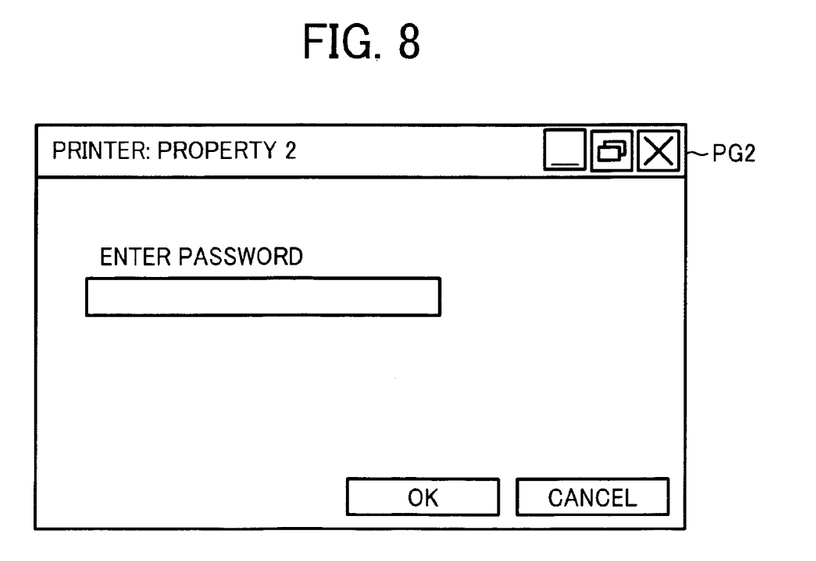
FIG. 8 is a second property screen according to one example embodiment.

Further, the PC 50 displays a second property screen PG2 shown in FIG. 8 on the display unit, in which a password can be input as personal identity verification information using the operator inputting unit when the personal identity verification is implemented. Such operation input may be used as personal identity verification information, which is one of printing conditions. Further, the PC 50 may use the identification information used for the information-leak proofed printing as one of printing conditions. The identification information may be, for example, a name or a user ID of print-requesting person that can identify the print-requesting person as above mentioned, and such identification information can be input by a print-requesting person using the operator inputting unit, or can be stored in advance in a main memory or an auxiliary memory. As such, the PC 50 generates and transmits print data including a print-requested image and printing conditions to the image forming apparatus 60, in which printing conditions may be set in view of operation input to be input by a print-requesting person. Such printing conditions may include at least personal identity verification information, identification information, and execution condition information designating which one of readability priority and productivity priority is implemented.

Figure 9:
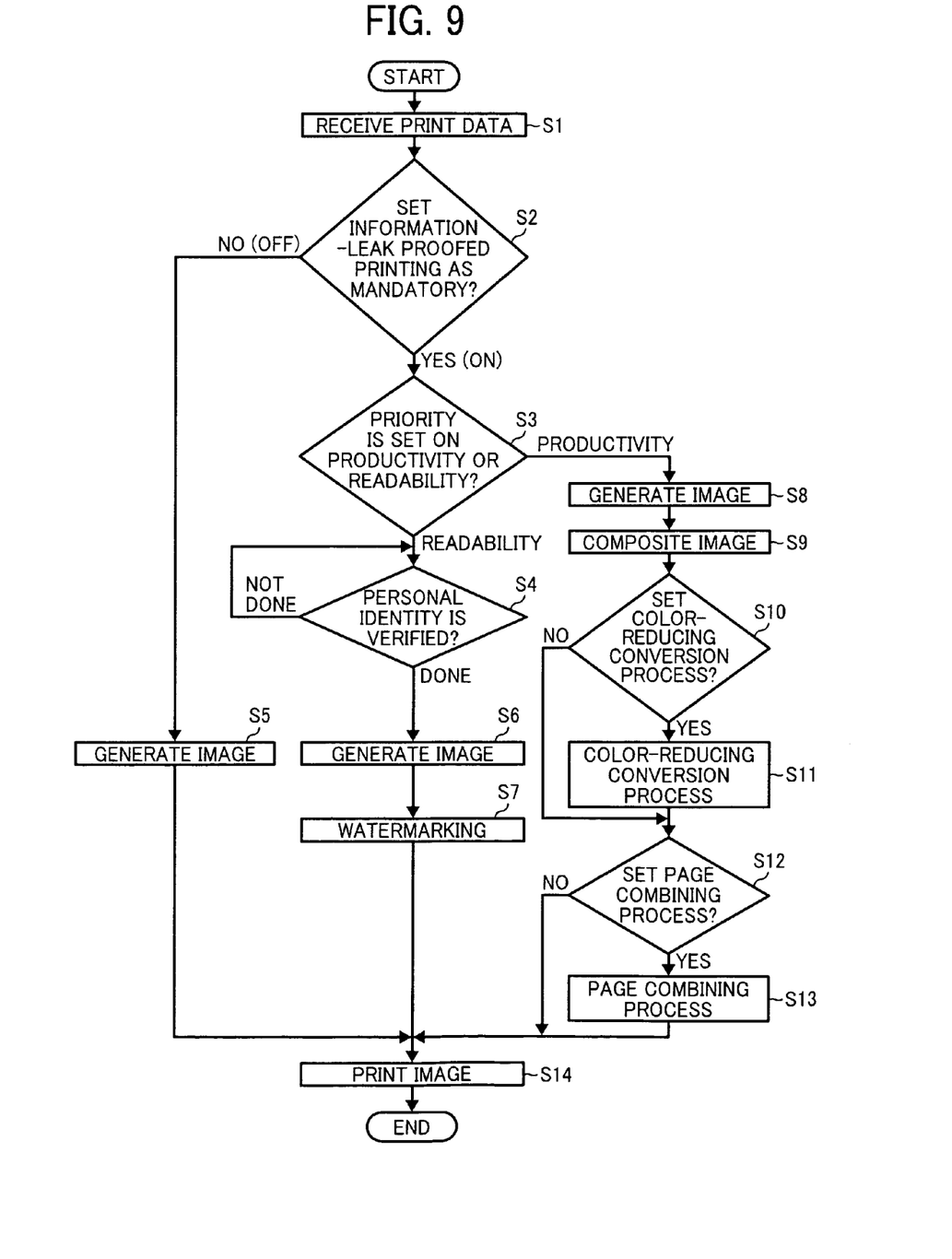
FIG. 9 is a flowchart of a printing process executed by the image forming apparatus according to one example embodiment.

A description is now given to a printing process of the image forming apparatus 60 according to an example embodiment with reference to FIG. 9. In this process, it is assumed that an administrator sets given setting condition using the above described first initial setting screen SG1 and the second initial setting screen SG2, and the setting information indicating contents of the setting is already stored in the auxiliary memory 63.

When the image forming apparatus 60 receives print data, including a print-requested image and printing conditions including at least personal identity verification information, identification information, execution condition information designating which one of readability priority and productivity priority is implemented, from the PC 50 (step S1), it is determined whether the information-leak proofed printing is set as mandatory by checking the setting information stored in the auxiliary memory 63 (step S2).

If the information-leak proofed printing is not set as mandatory (step S2: NO), the image forming apparatus 60 analyzes the print data received at step S1, and rasterizes image data corresponding to the print data to generate a bitmap format image (step S5), and then conducts an printing operation for the generated image data using the printing conditions included in the print data (step S15), in which the printing operation is implemented without using personal identity verification information, identification information, and execution condition information included in the print data.

On one hand, when the information-leak proofed printing is set as mandatory (step S2: YES), the image forming apparatus 60 analyzes the print data received at step S1, and it is determined whether the productivity priority or readability priority is set (or designated) for the information-leak proofed printing as one of printing conditions (step S3). At step S3, a user selects productivity priority or readability priority in view of information-leak proof printing. If the readability priority is set (step S3: readability), the image forming apparatus 60 conducts personal identity verification, in which it is determined whether personal identity verification information is input by a print-requesting person via the operation/display unit 65 (step S4). Upon inputting the personal identity verification information, the image forming apparatus 60 compares the input personal identity verification information and personal identity verification information, used as one of printing conditions included in the print data received at step S1 to conduct the personal identity verification process, and if the compared two pieces of personal identity verification information can be matched (step S4: matching confirmation), the image forming apparatus 60 rasterizes image data corresponding to the print data to generate a bitmap format image (step S6). Then, the image forming apparatus 60 embeds identification information, used as one of printing conditions included in the print data received at step S1, as watermark in the image generated at step S6 (step S7), and then conducts a printing operation for the watermark-embedded image using the printing conditions of the print data (step S14).

Figure 10:
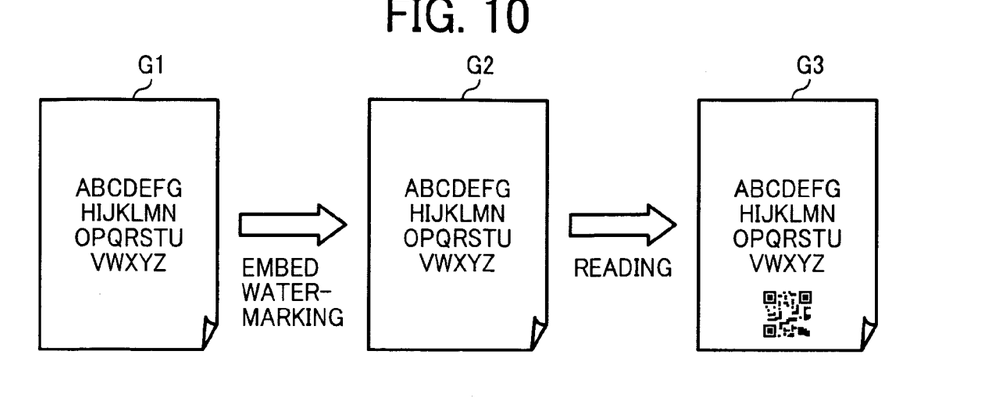
FIG. 10 shows an example image before embedding a watermark, an example image embedded with a watermark, and an example image when reading a watermark.

FIG. 10 shows example images embedded with watermark, in which an image G1 is an image before embedding a watermark, an image G2 is an image embedded with a watermark, and an image G3 is an image when reading embedded watermark. As shown in FIG. 10, human eyes may see or recognize the images G1 and G2 as a same image because human eyes cannot distinguish between the images G1 and G2. However, for example, when an image is embedded with watermark with a known method such as a method of fJP-2007-168282-A, identification information embedded as watermark can be appeared as a bar code in the image G3 by irradiating a special light source to the image G2, and the bar code is scanned to extract the identification information.

If the productivity priority is set and designated at step S3 (step S3: productivity), the image forming apparatus 60 rasterizes image data corresponding to the print data received at step S1 to generate a bitmap format image (step S8). Then, the image forming apparatus 60 synthesizes the identification information, included as one of printing conditions in the print data received at step S1, as text information in the image generated at step S8 to generate a composite image (step S9).

Figure 11:
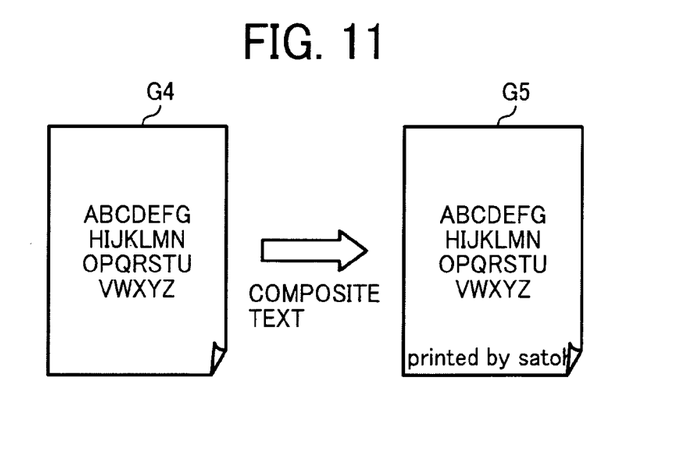
FIG. 11 shows an example image before synthesizing identification information, and an example image after synthesizing identification information.

FIG. 11 shows example images when identification information is synthesized in one image, in which an image G4 is an image before synthesizing identification information, and an image G5 is an image synthesized with identification information. As shown in FIG. 11, identification information is synthesized to the image G4, and the image G5 including text information which can be read by human eyes is printed at a footer, in which text information such as for example "printed by satoh" is printed, wherein "satoh" is name of a person requesting image formation such as printing. Accordingly, if an administrator sees printout products printed with such image and text information, the administrator can identify a print-requesting person from the name printed as the identification information.

The explanation returns to FIG. 9. After step 59, the image forming apparatus 60 checks the setting information stored in the auxiliary memory 63 to determine whether a color-reducing conversion process is set when the information-leak proofed printing is set and the priority is set for productivity (step S10). If the color-reducing conversion process is set (step S10: YES), the image forming apparatus 60 converts the composite image generated at step S9 by reducing number of colors expressing the image. For example, if the composite image generated at step S9 is a full color image, the image forming apparatus 60 converts the composite image to a color-reduced image by reducing the number of colors expressing the composite image to one color (e.g., black) or two colors (e.g., black and red) (step S11). Then, the image forming apparatus 60 determines whether a page combining process is set when the information-leak proofed printing is set and the priority is set for productivity (step S12). If the color-reducing conversion process is not set (step S10: NO), the process goes to step S12.

If the page combining process is set (step S12: YES), the image forming apparatus 60 combines a plurality of pages into one page by decreasing the size of images for the composite image generated at step S11, or for the composite image generated at step S9 if the determination result is "NO" at step S10, by which images corresponding to a page-combining unit can be generated (step S13). The numbers of page to be combined together as one page may be referred to as a page-combining unit. Then, a printing operation is implemented for images combined by the page-combining unit using the printing conditions included in the print data (step S14).

When the information-leak proofed printing is set and the productivity priority is set, and then the color-reducing conversion process is not set and the page combining process is not set, the image forming apparatus 60 conducts a printing operation for the image generated at step S9 using printing conditions included in the print data (step S14).

As above described, the administrator can set whether the information-leak proofed printing such as secure printing is mandatory while a print-requesting person can select whether readability priority or productivity priority is set for the information-leak proofed printing. Accordingly, information leak prevention based on a demand of an administrator, and the print-requesting person's demand on productivity or readability for a printing operation can be both satisfied. Accordingly, the administrator's demand on higher security to prevent information leak from printed matter can be satisfied while the print-requesting person's demand on higher productivity or higher readability for a printing operation can be satisfied.

Such higher productivity may be used, for example, when a print-requesting person is so rush for a printing operation because he or she is to go out somewhere soon. If only the print-requesting person sees and reads printed matter having image at outside of offices without the PC 50, readability is not a high demand, by which appearance of printout product does not become an issue. On one hand, such higher readability may be used, for example, when documents such as business report to be read by others are printed with images. In this case, the printout product is read by others, by which printed matter may be required to be finished as a clean version by taking some time so that no one misunderstands contents in documents.

When a print-requested image is mostly consisted of sentences, and the trace printing using composite text is implemented for a printout product, such printout product may be miss-read by a person who does not know the trace printing. For example, such person may miss-read text in a footer as a continuation of sentences in main text when he or she reads the printout product having the composite text. Further, such text information at the footer may irritate human eyes from a viewpoint of text arrangement design. As such, the readability for trace printing using composite text may not be so high compared to the readability for trace printing using watermark. However, the trace printing using composite text can be utilized as having higher security effect, and the trace printing using composite text may not need the process of personal identity verification. Accordingly, the productivity of trace printing using composite text is better than the productivity of printing operation using both security printing and trace printing using watermark.

On one hand, the trace printing using watermark includes a process of attaching information that cannot be sensed directly (e.g., human eyes) but can be read by machine, by which it is a very low probability that a person may miss-read contents of printout product. However, there is some possibility of miss-reading of identification information embedded as watermark by machine (e.g., scanning error), and the process of personal identity verification is required to conduct secure printing, and a relatively longer time is required compared to trace printing using composite text, by which the productivity of process of combining secure printing and trace printing using watermark may not be so high compared to trace printing using composite text.

Further, in the above described example embodiment, information leak can be effectively prevented because the administrator determines whether the information-leak proofed printing is set as mandatory. Specifically, a print-requesting person has no merits of conducting the information-leak proofed printing such as secure printing, trace printing, or the like. Accordingly, if a decision of an implementation of information-leak proofed printing is on hands of persons requesting image formation, such persons may choose not to implement the information-leak proofed printing, or may not implement the information-leak proofed printing for all of printing operations. In such situations, the administrator's demand on the information-leak proofed printing may not be followed by persons requesting image formation. In contrast, in example embodiment, the information-leak proofed printing can be effectively implemented in line with the administrator's demand, by which information leak can be effectively prevented.

Further, by conducting a color-reducing conversion process when trace printing is set and the priority is set for productivity, consumption of color materials used for printing operation can be reduced, by which a running cost can be reduced. Further, by conducting a page combining process when trace printing is set and the priority is set for productivity, consumption of sheets used for printing operation can be reduced, by which a running cost can be also reduced.

In the above described example embodiment, some or all functional units used for the image forming apparatus 60 shown in FIG. 4 can be configured as hardware, or can be configured as ASIC using the image processor 66.

In the above described example embodiment, the image forming apparatus 60 may include at least any one of a copy function, a scanner function, and a facsimile function in addition to the above described printer function. If the image forming apparatus 60 includes a scanner function, a scanner for scanning images is disposed, and if the image forming apparatus 60 includes a facsimile function, a facsimile unit for transmitting/receiving facsimile is disposed. Further, the image forming apparatus 60 can be connected to one or more of the PCs 50 via the network NT1.

In the above described example embodiment, the image forming apparatus 60 converts image data corresponding to print data received from the PC 50 to a bitmap format image, but other formats can be used for image conversion, or the image conversion may not be implemented in some cases.

In the above described example embodiment, when the information-leak proofed printing is set and the priority is set for productivity, the image forming apparatus 60 is provided with settings to select the color-reducing conversion process, the page combining process, or not conducting any of these. However, the image forming apparatus 60 can be used without providing such settings. Further, when the information-leak proofed printing is set and the priority is set for productivity, both color-reducing conversion process and page combining process may be implemented.

Further, other than the color-reducing conversion process and page combining process, a double-face printing, which is a printing operation for forming images on both faces of print medium, may be set and implemented. With such a configuration, sheet consumption can be reduced, and running cost can be reduced. Further, a process of universal color conversion process may be set and implemented for printing operation. The universal color conversion process converts colors of print-requested image to colors that can be recognized easily by partially color-blind persons, by which printed matter which is easy to recognize for any person can be output without reminding a print-requesting person such universal color matter.

In the above described example embodiment, the image forming apparatus 60 is used to set whether the information-leak proofed printing is set as mandatory or not, but the PC 50 can be used for such setting. In such a configuration, the PC 50 may include a function of setting unit 603, and display the first initial setting screen SG1 of FIG. 5 on the display unit, and set whether the information-leak proofed printing is set as mandatory or not based on an operation input by the administrator using the operator inputting unit. Then, the PC 50 transmits print data, including printing conditions that includes such setting of the information-leak proofed printing as one of the setting information, to the image forming apparatus 60.

Further, when the information-leak proofed printing is set and the priority is set for productivity, the PC 50 can be used to set whether the color-reducing conversion process is set, whether the page combining process is set, or whether both of the color-reducing conversion process and page combining process are not set. In such a configuration, the PC 50 may display the second initial setting screen SG2 of FIG. 6 on the display unit, and when the information-leak proofed printing is set and the priority is set for productivity, the PC 50 determines whether the color-reducing conversion process is set, whether the page combining process is set, or whether both of the color-reducing conversion process and page combining process are not set based on an operation input by the administrator using the operator inputting unit. Then, the PC 50 transmits print data, including printing conditions that includes such setting of the color-reducing conversion process and page combining process as one piece of the setting information, to the image forming apparatus 60. When the image forming apparatus 60 receives such print data from the PC 50 at step S1 of printing process of FIG. 9, the process at step S2 to S14 can be implemented using the setting information included in the print data and an analysis result of the print data.

In the above described example embodiment, when the information-leak proofed printing is set, the priority can be set to any one of productivity and readability for each print-requested image, or for each print-requesting person, for example.

In the above described example embodiment, information leak can be prevented in line of the administrator's demand, and productivity or readability priority of printing operation can be set by a print-requesting person who instructs an printing operation, by which the administrator's demand on information leak prevention and print-requesting person's demand on productivity or readability priority can be simultaneously satisfied.

In the above-described example embodiments, computer-readable program can be stored in a recording medium such as hard disc, ROM, or the like. Further, computer-readable program can be stored in a removable recording medium such as magnetic disc (e.g., flexible disc), optical disc (e.g., compact disc, digital versatile disc), and magneto-optical disc (MO) temporarily or permanently. Such removable recording medium may be available as package software. Further, computer-readable program can be installed to a computer from such removable recording medium, or can be downloaded from a download site via a network. For example, program can be transmitted to a computer from a download site using wired or wireless communication via a network such as local area network (LAN), the Internet, or the like, and such downloaded program can be installed in a recording medium such as hard disc in the computer. As such, in the above-described example embodiment, a computer can be used with a computer-readable program to control functional units, devices, or the like used for conducting the above-described processes. For example, a particular computer (e.g., personal computer, work station) may control the image forming system or apparatus using a computer-readable program, which can execute the above-described processes or steps. Further, in the above-described exemplary embodiment, a storage device (or recording medium), which can store computer-readable program, may be a flexible disc, a compact disc read only memory (CD-ROM), a digital versatile disc read only memory (DVD-ROM), DVD recording only/rewritable (DVD-R/RW), a memory card, a memory chip, a mini disc (MD), a magneto-optical disc (MO), magnetic tape, hard disc in a server, or the like, but not limited these. Further, a computer-readable program can be downloaded to a particular computer (e.g., personal computer) via a network such as the Internet, or a computer-readable program can be installed to a particular computer from the above-mentioned storage device, by which the particular computer may be used for the image forming system or apparatus according to example embodiment, for example.

Numerous additional modifications and variations are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. An image forming system, comprising:
   an information processing apparatus; and
   an image forming apparatus connected to the information processing apparatus via a network,
   the information processing apparatus including,
      a preparation unit configured to prepare execution condition information designating which of readability and productivity is prioritized when conducting information-leak proofed printing, based on a selection operation by a user;
      a receiving unit configured to receive an input of personal identity verification information of the user to be used for a personal identity verification process; and
      a transmission unit configured to transmit print data including a print-requested image designated by the user, identification information for identifying the user, the personal identity verification information received by the receiving unit, and the execution condition information prepared by the preparation unit to the image forming apparatus,
   the image forming apparatus including,
      a setting unit configured to set whether an implementation of the information-leak proofed printing is mandatory depending on a selection operation by the administrator of the image forming apparatus;
      a receiving unit configured to receive the print data transmitted from the information processing apparatus;
      a determination unit configured to determine whether the execution condition information included in the print data designates readability priority or productivity priority;
      a personal identity verification unit configured to conduct a personal identity verification process using the personal identity verification information included in the print data when the setting unit sets the information-leak proofed printing mandatory, and the determination unit determines readability priority is designated by the execution condition information;
      a watermark-embedded image generation unit configured to generate a watermark-embedded image by embedding a watermark for the identification information for identifying the user included in the print data to the print-requested image included in the print data when the personal identity verification unit succeeds the personal identity verification process;
      a text synthesizing image generation unit configured to generate a composite image by synthesizing text indicating the identification information for identifying the user included in the print data to the print-requested image included in the print data when the setting unit sets the information-leak proofed printing mandatory and the determination unit determines productivity priority is designated by the execution condition information;
      a normal image generation unit configured to generate a normal image based on the print-requested image included in the print data without using the identification information for identifying the user when the setting unit does not set the information leak proofed printing mandatory; and
      a print unit configured to conduct a printing operation for one of the watermark-embedded image, the text composite image and the normal image.

2. The image forming apparatus of claim 1, wherein
   the print-requested image included in the print data includes page-by-page image data,
   the setting unit is configured to further set whether an implementation of a page combining process is conducted depending on a selection operation by the administrator when the information-leak proofed printing is implemented while designated productivity priority, and
   the text synthesizing image generation unit is configured to combine a plurality of pages included in the print-requested image into one single page and generates a text composite image for each combined page when the setting unit sets the information-leak proofed printing mandatory, the determination unit determines productivity priority is designated by the execution condition information and the setting unit sets the implementation of a page combining process.

3. The image forming apparatus of claim 1, wherein
   the information processing apparatus further includes an image converter configured to convert the print-requested image included in the print data to an image having a given format to generate a converted image,
   the watermark-embedded image generation unit is configured to generate the watermark-embedded image by embedding a watermark for the identification information for identifying the user to the converted image when the setting unit sets an implementation of information-leak proofed printing is mandatory, the determination unit determines readability priority is designated by the execution condition information, and the personal identity verification unit succeeds the personal identity verification process,
   the text synthesizing image generation unit is configured to generate the text composite image by synthesizing text indicating the identification information for identifying the user to the converted image when the setting unit sets an implementation of information-leak proofed printing is mandatory, the determination unit determines productivity priority is designated by the execution condition information, and
   the normal image generation unit is configured to generate the normal image based on the converted image without using the identification information for identifying the user when the setting unit does not set the information-leak proofed printing mandatory.

4. An image forming method for an image forming system having an information processing apparatus and an image forming apparatus connectable with each other via a network, the method comprising the steps of:

in the information processing apparatus,
preparing execution condition information designating which of readability and productivity is prioritized when conducting information-leak proofed printing, based on a selection operation by a user;
receiving an input of personal identity verification information of the user to be used for a personal identity verification process;
transmitting print data including a print-requested image designated by the user, identification information for identifying the user, the personal identity verification information received by the receiving unit, and the execution condition information prepared by the preparation unit to the image forming apparatus;
further in the image forming apparatus,
setting whether an implementation of the information-leak proofed printing is mandatory depending on a selection operation by the administrator of the image forming apparatus;
receiving the print data transmitted from the information processing apparatus;
determining whether the execution condition information included in the print data designates readability priority or productivity priority;
conducting a personal identity verification process using the personal identity verification information included in the print data when the setting step sets the information-leak proofed printing mandatory, and the determination step determines readability priority is designated by the execution condition information;
generating a watermark-embedded image by embedding a watermark for the identification information for identifying the user included in the print data to the print-requested image included in the print data when the personal identity verification succeeds by conducting the personal identity verification process;
generating a text composite image by synthesizing text indicating the identification information for identifying the user included in the print data to the print-requested image included in the print data when the setting step sets the information-leak proofed printing mandatory, and the determination step determines productivity priority is designated by the execution condition information;
generating a normal image based on the print-requested image included in the print data without using the identification information for identifying the user when the setting step does not set the information-leak proofed printing mandatory; and
conducting a printing operation for one of the watermark-embedded image, the text composite image, and the normal image.

5. The method of claim 4, wherein
the print-requested image included in the print data includes page-by-page image data,
the setting step further sets whether an implementation of a page combining process is conducted depending on a selection operation by the administrator when the information-leak proofed printing is implemented while designating productivity priority, and
the generation step of text synthesizing image combines a plurality of pages included in the print-requested image into one single page and generates a text composite image for each combined page when the setting step sets the information-leak proofed printing mandatory, the determination step determines productivity priority is designated by the execution condition information, and the setting step sets the implementation of a page combining process.

6. The method of claim 4, further comprising:
converting the print-requested image included in the print data to an image having a given format to generate a converted image in the information processing apparatus, wherein
the generation step of the watermark-embedded image generates the watermark-embedded image by embedding the watermark for the identification information for identifying the user to the converted image when the setting step sets an implementation of information-leak proofed printing is mandatory, the determination step determines readability priority is designated by the execution condition information, and the personal identity verification succeeds by conducting the personal identity verification process,
the generation step of the text synthesizing image generates the text composite image by synthesizing text indicating the identification information for identifying the user to the converted image when the setting step sets an implementation of information-leak proofed printing is mandatory, the determination step determines productivity priority is designated by the execution condition information, and
the generation step of the normal image generates the normal image based on the converted image without using the identification information for identifying the user when the setting step does not set the information-leak proofed printing mandatory.

* * * * *